Figure 1:
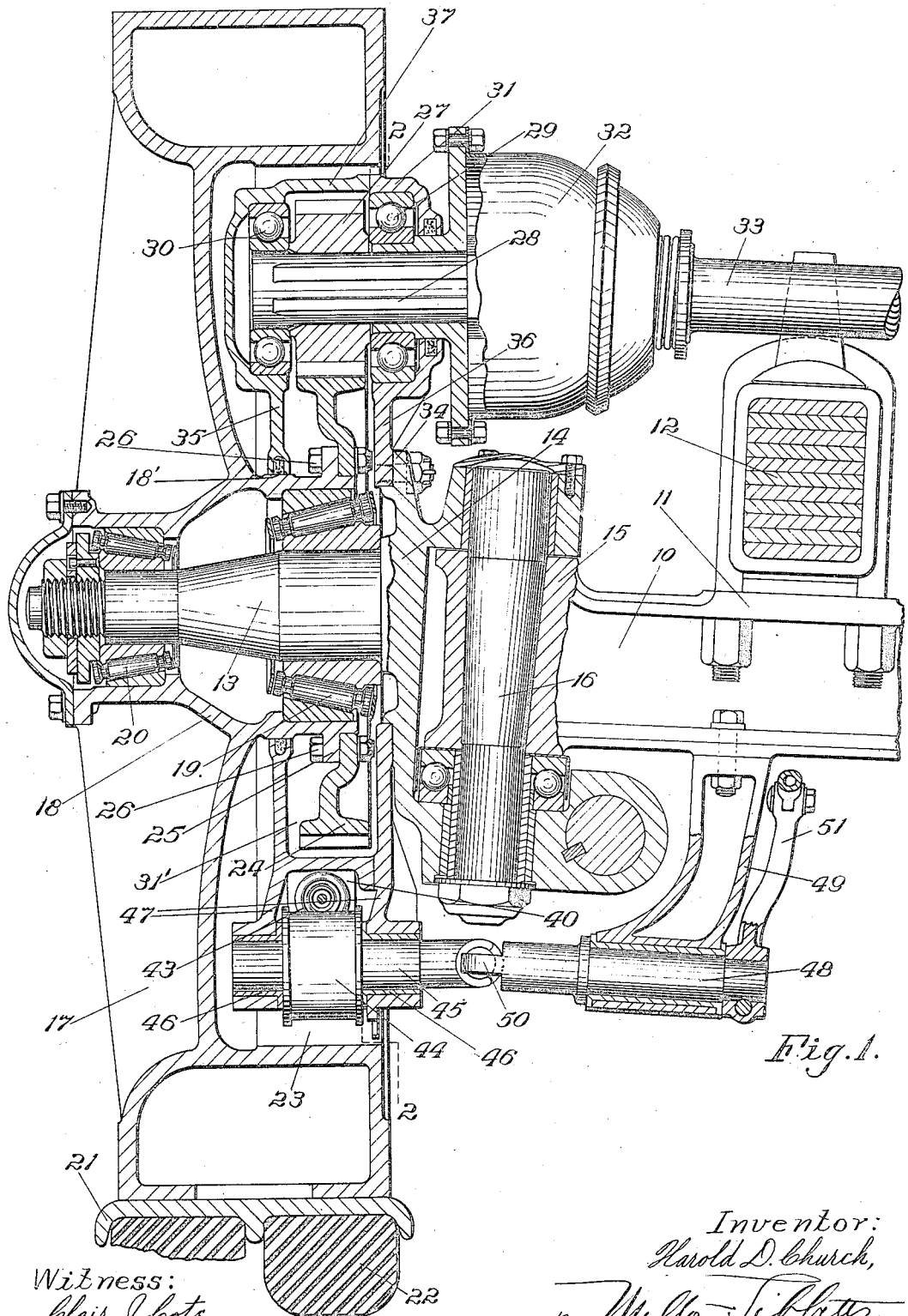

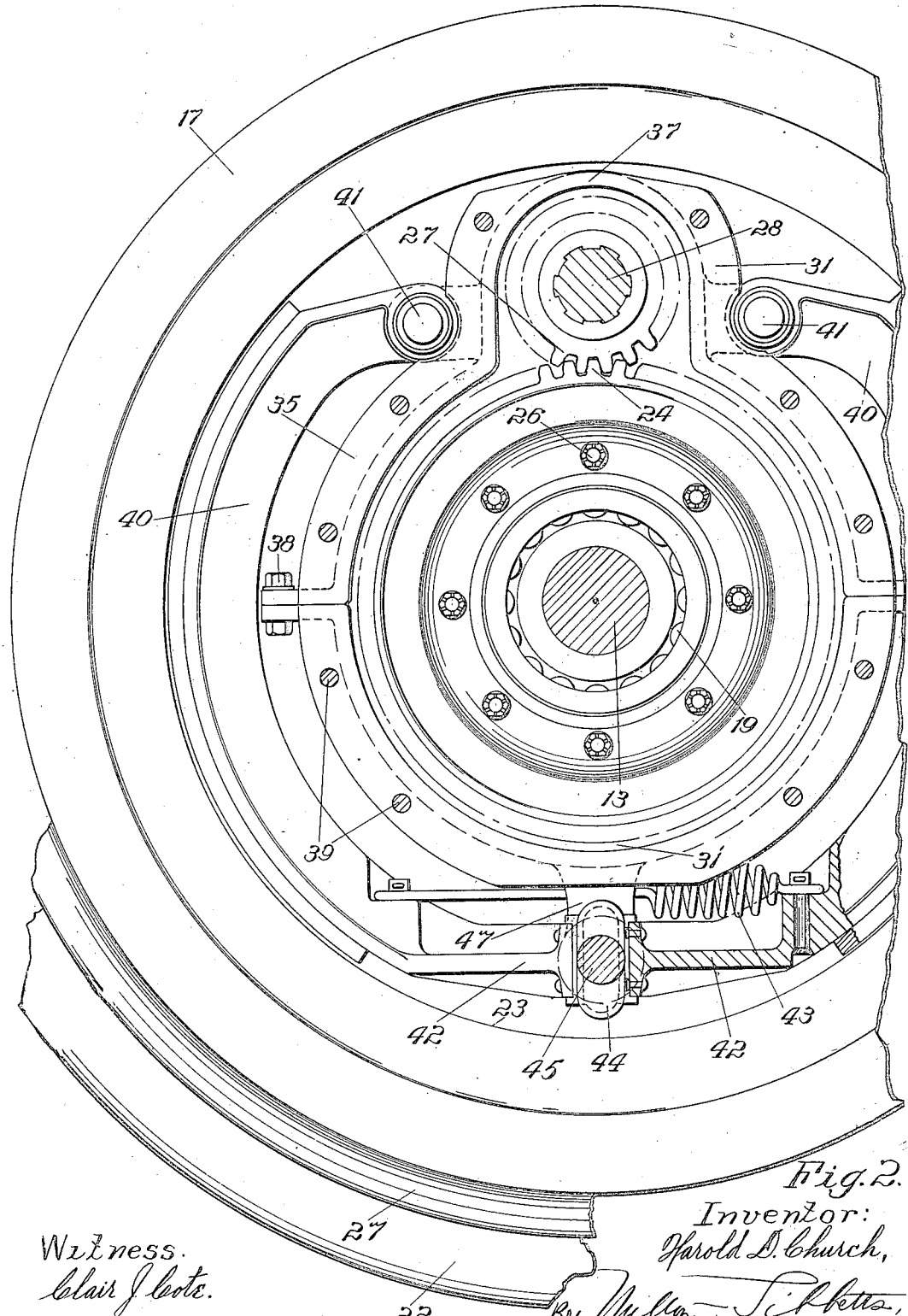

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,305,061.  Specification of Letters Patent.  Patented May 27, 1919.

Application filed September 10, 1915. Serial No. 49,977.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to motor vehicles and particularly to the driving mechanism thereof.

One of the objects of the invention is to provide an indirect or geared drive from a shaft arranged parallel to the axle to the vehicle wheel, one that may be used in connection with a steering or a solid axle.

The above and other objects will appear from the following description taken in connection with the drawings, which form a part hereof, and in which:—

Figure 1 is a vertical section through one of the driving wheels and the end of an axle of a motor vehicle; and Fig. 2 is a section substantially on the line 2—2 of Fig. 1.

In the drawings 10 represents a portion of a motor vehicle axle having a spring pad 11 upon which is mounted a spring 12, and also having a spindle 13 which may be formed as an integral part thereof, or as part of a steering knuckle 14 pivoted to the enlarged end 15 of the axle as by the pivot pin 16.

A wheel 17 of suitable construction having a hub 18 is mounted in bearings 19 and 20 upon the spindle 13. This wheel is shown as formed of a steel casting having the usual separately formed rim 21 and solid rubber tires 22, and it is also provided with an interior cylindrical braking surface 23 which is arranged outwardly of the inner end of the hub 18. Said hub has a gear 24 secured thereon and as shown it is bolted to a flange 25 on the hub as by the bolts 26. The gear shown is a spur gear and it is adapted to mesh with a spur pinion 27 which is mounted radially of it and between said gear and the braking surface 23. The shaft 28 of the pinion 27 is supported in a pair of spaced bearings 29 and 30 in a casing 31. Also, the shaft 28 and its pinion are driven by a suitably incased universal joint 32 and driving shaft 33, which latter is suitably connected to the motor of the vehicle by the usual mechanism, not shown. It will be understood that the universal joint 32 is arranged above the pivot pin 16 and in line with the axis thereof so that any movement of the steering knuckle 14 about said axis will have no material effect upon the driving and connection of the shafts 33 and 28.

The casing 31 above referred to is formed in several parts and is rigidly secured to or mounted upon the steering knuckle 14 as by the flange and bolt connection 34. This casing or support 31 for the pinion 27 surrounds and houses the pinion as well as the gear 24 and it thus has two separated walls, an inner wall 35 and an outer wall 36, as well as a peripheral or rim part 37. The rim part may be integral with either of the walls but it is shown as integral with the inner wall 35, and this inner part of the casing, that is the part nearest to the center of the wheel, is formed in two parts divided along the axis of the spindle 13 so that said inner part of the casing may be assembled inside of the flange 25 of the hub. The two parts are bolted together as by the bolts 38. The inner and outer parts of the casing 31 are also bolted together as by the series of bolts 39. The inner wall 35 of the casing 31 makes a working joint on the hub 18 inside of the flange 25 and gear 24, as at 18', this joint being packed as shown to prevent escape of lubricant, and since the gear is peripherally larger than the hub the casing 31 forms a well 31' in which the gear 24 operates and carries lubricant to the pinion 27 and its supporting bearings.

A pair of brake shoes 40 of segmental form are adapted to coöperate with the braking surface 23 of the wheel and are pivoted as at 41 to the support or casing 31 upon opposite sides of the pinion 27. These brake shoes extend around the outside of the casing and between the latter and said braking surface 23 and their free ends 42 are yieldingly drawn together by a spring 43. Between these free ends is a cam 44 adapted to be rotated to separate the brake shoes and press them into contact with the braking surface 23. This cam 44 is mounted on a shaft 45 in suitable bearings 46 in lugs 47 extending downwardly from the casing 31, and a suitable operating shaft 48 mounted in a bracket 49 secured to the axle 10, as will be clearly seen in Fig. 1 of the drawings, is connected to the shaft 45 by a universal joint 50 which is beneath the pivot pin 16 and directly in line with the axis thereof, so that the oscillation of the knuckle 14 will not interfere with the operation of the brakes. An arm 51 is secured to the inner end of the shaft 48 for operating the latter.

Having thus described my invention, what I claim and desire to secure by Letters Patent is:—

1. In a motor vehicle, in combination, a spindle, a wheel rotatably mounted thereon and having an interior braking surface, a gear secured to the wheel within said braking surface, a driving pinion in mesh with said gear and arranged between said gear and braking surface, a casing inclosing said gear and pinion and separating the same from the braking surface and having radial walls co-acting with the outer surface of the hub to form a chamber and brake shoes pivoted to said casing on opposite sides of said pinion, and means for operating said brake shoes.

2. In a motor vehicle, in combination, an axle having a spindle, a wheel having a bearing hub mounted to rotate on said spindle, and having an interior braking surface annularly surrounding said bearing hub, said surface and hub lying within the planes of the sides of the wheel, a gear secured to and annularly surrounding said hub, a pinion meshing with said gear, an annular hollow casing between the hub and braking surface and having two separable parts, one of which is detachably secured to the spindle, said parts co-acting with the hub to form a chamber for said pinion and gear, and brake shoes pivoted on the casing.

3. In a motor vehicle, in combination, an axle having a spindle pivoted thereto, a wheel having a hub mounted to rotate on said spindle and having a braking surface annularly surrounding the hub, a gear larger than said hub and secured thereto, a pinion meshing with said gear, a casing arranged between said spindle pivot and the wheel and having spaced walls co-acting with the hub to form a chamber inclosing the gear and pinion, one of which walls is detachably secured to the spindle and the other of which makes a working joint with the wheel hub on the opposite side of said gear, brakes mounted on said casing, and means for operating said pinion and brake shoes.

4. In a motor vehicle, in combination, an axle having a spindle pivoted thereto, a steerable driven wheel having a hub mounted in bearings on said spindle within the planes of the side faces of the wheel, a braking surface annularly surrounding the hub, a gear secured to said hub, a pinion meshing with said gear, a casing annularly disposed between said hub and braking surface and inclosing said gear and pinion, said casing being secured to said spindle and having an inwardly extending flange making a close working joint on said hub, brake shoes pivoted on the casing and disposed within said planes.

5. In a motor vehicle, in combination, an axle having a spindle pivoted thereto, a wheel having a hub mounted in bearings on said spindle, and having a braking surface within the planes of the side faces of the wheel, a gear secured to said hub and peripherally larger than said hub, a pinion meshing with said gear, a casing arranged on said spindle between said spindle pivot and the wheel for mounting said pinion and having an inwardly extending flange making a working joint on said hub, brakes mounted below said gear, within said planes, and a shaft for driving said pinion.

6. In a motor vehicle, in combination, an axle having a spindle pivoted thereto, a wheel having a hub mounted in bearings on said spindle and having a braking surface annularly surrounding the hub, a gear secured to said hub, a pinion meshing with said gear, a double walled casing arranged between said spindle pivot and the wheel for mounting said pinion, one of the walls of said casing being secured to the axle and the other making a working joint on said hub, brakes mounted on said casing and a shaft for driving said pinion.

7. In a motor vehicle, in combination, an axle having a spindle pivoted thereto, a wheel having a hub mounted in bearings on said spindle, and having a braking surface annularly surrounding the hub and within the planes of the side faces of the wheel, an external spur gear secured to said hub, a pinion meshing with said gear, a casing arranged on said spindle between said spindle pivot and the wheel for housing said gear and pinion, brakes mounted on said housing and shafts for operating said pinion and brakes.

In testimony whereof I affix my signature.

HAROLD D. CHURCH.